3,075,959
PROCESS OF PURIFYING POLYOLEFINS
Siegfried Wagener, Sulzbach, Taunus, Herbert Kreuter, Eschborn, Taunus, and Siegfried Sommer, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 29, 1958, Ser. No. 736,455
Claims priority, application Germany May 24, 1957
11 Claims. (Cl. 260—93.7)

The present invention relates to a process of isolating polyolefins.

It has already been proposed to polymerize olefins, especially ethylene and propylene, under relatively low pressures and at relatively low temperatures by means of reducible heavy metal compounds, particularly titanium tetrachloride, and metallo-organic compounds such as aluminum alkyl halides, in order to obtain polyolefins of high molecular weight. These processes are called low-pressure processes and are described by Raff-Allison, "Polyethylene" (1956), pp. 72–81.

For the polymerization there are used inert solvents or dispersing agents, such as aliphatic hydrocarbons. The polymer is obtained suspended in the solvent in a finely divided state and has to be freed from the dispersing agent and from still adherent or occluded catalyst residues in further processing stages, it being of the utmost importance that all foreign constituents be completely eliminated in the course of these stages since the quality of the polyolefins is very much impaired by the residual quantities of catalyst. Since the catalyst combinations to be used contain in all cases high portions of chlorine (for example, $TiCl_4$ and $Al(C_2H_5)_2Cl$), it must be warranted that these aggressive constituents be completely eliminated or neutalized.

If a polyolefin prepared with the above-described catalyst system contains even the smallest portions of hydrolyzable chlorine which, in most cases, can no longer be traced by way of analysis, there occur strong corrosive phenomena when processing the polymer on extruders, injection molding machines etc. which fact, in addition to the corrosion of machine parts, also results in intolerable discolorations and contaminations of the molded articles.

There have, accordingly, been proposed several methods for the purification of these highly polymeric hydrocarbons. The removal of the main amount of catalyst is attained, in most of these processes, either by adding alcohols, such as butanol, or by treating the hydrocarbons with aqueous acids or lye solutions. However, when working according to the methods proposed, it is difficult to completely eliminate or neutralize the last traces of aggressive catalyst constituents because the aqueous phase and the hydrocarbon phase are coexistent. The known processes not being successful is thus due simply to the fact that, even when additionally using wetting agents, it is not possible to a sufficient extent to bring the hydrophobic polymer particles into contact with the aqueous phase so that the aqueous agents can only partially permeate into the polymer grain.

Now we have found that a polyolefin prepared by the low-pressure process in a hydrocarbon suspension can be isolated in a purified form by treating the polyolefin obtained in a hydrocarbon suspension with a mixture of alcohol and an alkaline reacting compound of a metal of groups I and II of the periodic table, said alcohol containing 3–8 carbon atoms.

The low-pressure polyolefins available in a pulverulent form can, of course, also be treated according to the process of the invention; the treatment of the polyolefin suspension is, however, advantageous.

It is a special advantage of the process according to the invention that alcohols are used being soluble in hydrocarbons, such as hexane, cyclohexane, heptane, octane, benzene, toluene, saturated petroleum fractions of the diesel-oil boiling range of 180° C. to 280° C. which are utilized for the preparation of low-pressure polyolefins. By this measure there are simultaneously brought into the hydrocarbon the alkalies necessary for the processing operation.

It is surprising that in this manner there can already be dissolved, with relatively small amounts of alcohol, a certain amount of alkali in the inert hydrocarbon without precipitation of the alkali. It is only necessary that relatively little alcohol be present in the dispersing medium, said alcohol acting as a solubilizing agent. In other words: if there is added to an aliphatic or cyclo-aliphatic hydrocarbon a small amount of an alcohol readily soluble in said hydrocarbon, it is possible to dissolve in this solvent mixture considerable amounts of a hydroxide of an alkali metal or alkaline earth metal per se or in mixture with the salts thereof with organic acids. The solution then has a pronounced alkaline reaction; the alkali content can precisely be determined by titration.

It is also possible to prepare an "alkaline reacting" hydrocarbon when, after having added a little alcohol to the hydrocarbon, this hydrocarbon is treated with pulverized alkali metal hydroxides or with the highly concentrated aqueous solutions thereof. Also when proceeding in this manner, part of the alkaline reacting substance is passed from the solid or aqueous phase into the hydrocarbon phase.

When operating the process of this invention, the advantage derived for the processing of polyolefins is obvious. Owing to the possibility of dissolving the alkaline reacting substances to a clear solution in the hydrocarbon used in the course of the polymerization, the hydrolysis of the chlorine-containing catalyst constituents contained in the polymer grain can be effected within a short time and in a complete manner. The alkali dissolved in the hydrocarbon can now penetrate into the interior of the polymer particle and react with the catalyst constituents present in said particle.

Alcohols being miscible in any proportion with the hydrocarbon are best suited for the afore-described working method. If, for example, a saturated petroleum fraction of the diesel oil boiling range is used for the polymerization, there may successfully be employed isopropanol, butanol, isobutanol or cyclohexanol. The amount of the alcohol being used generally amounts to 0.1–5% by volume, calculated on the dispersing medium (suspension medium). There is suitably chosen a concentration ranging from 0.2–1%, calculated on the dispersing medium.

The kind of alkali to be employed depends on the choice of the hydrocarbon and the alcohol. For example, in a solvent mixture composed of heptane and 1% of butanol, there is soluble a much larger amount of potassium hydroxide than of sodium hydroxide. The amount of the alkali is determined by the concentration of the constituents to be hydrolized and amounts in most cases to 0.01–1% by weight, calculated on the polymer.

When carrying the invention into effect, the details of the afore-described working method will suitably be as follows:

The polymer suspension obtained is first freed of the main amount of catalyst according to known methods. This can, for example, be brought about in a manner such that the polymer suspension still containing amounts of catalyst is stirred for one hour at 75° C. with the exclusion of air while adding 1% of butanol (calculated on the dispersing medium); the suspension is then several times extracted with water. After separation of the aqueous phase, there is added 1% by volume of a solution of 10% strength by weight of potassium hydroxide in butanol, while stirring for a short time. Then the suspension is washed with water until the wash water has a neutral reaction. The polymer is separated from the dispersing medium by means of a filter, and dried.

The polymer powder obtained in this manner yields colorless shaped articles by pressure or injection molding. The machine parts did not show signs of corrosion even after the experiments had been carried on for a prolonged period of time.

The examples furnished below shall more fully describe the method used for treating low-pressure polyolefins, such as low-pressure polyethylene, low-pressure polypropylene, low-pressure polybutene and copolymers of the corresponding monomers. The examples serve to illustrate the invention, but they are not intended to limit it thereto.

*Example 1*

300 ml. of a polyethylene suspension which was prepared by the polymerization of ethylene—while using TiCl$_4$ and diethyl aluminum monochloride—in a petroleum fraction boiling at 200–220° C. and containing about 100 grams of polymer, are stirred, after having added 3 ml. of butanol, for one hour at 80° C. with the exclusion of air. Then 100 ml. of water are added while stirring the mixture intensively for 10 minutes. The mixture is allowed to sit and the aqueous phase is separated. The washing process is repeated twice, then 3 ml. of a 10% solution of potassium hydroxide in butanol are added to the suspension. The mixture is stirred for 30 minutes and washed three times with 100 ml. of water, each time for 10 minutes. The polymer is separated from the dispersing medium on a suction-filter and dried in the vacuum drier at 90° C.

There are obtained about 100 grams of polyethylene powder which, when being pressure-molded into sheets at 200° C., show no discoloration. When a small steel sheet which had been weighed is placed between two plates made of this product, and when these sheets are pressure-molded for 15 minutes at 160° C., the small metal sheet, when being removed from the plastic material and being stored at room temperature for 48 hours, undergoes no increase in weight which fact demonstrates that the steel has suffered no corrosion by the polyethylene.

When this corrosion test is carried out with a polymer which had been worked up without butanol-potassium hydroxide, the increase in weight of the small metal sheet is 0.5%. The steel surface is rough and corroded.

*Example 2*

300 ml. of a polypropylene suspension which had been prepared by polymerization of propylene in methyl cyclohexane with TiCl$_3$ and Al(C$_2$H$_5$)$_3$, are stirred for 30 minutes at 85° C. while adding 8 ml. of isopropanol, and are exhaustively extracted with water. Then 1.5 ml. of butanol and 1 ml. of a solution of caustic soda of 50% strength by weight are added to the polymer suspension, the suspension is stirred intensively for two hours and is again washed, each time with 100 ml. of water.

After having separated and dried the product, there are obtained 120 grams of a polypropylene powder which, in the course of a corrosion test carried out according to Example 1, produces no corrosive effect.

*Example 3*

100 l. of a polyethylene suspension containing about 30 kilos of polyethylene are stirred thoroughly for 30 minutes with 20 l. of a solution of caustic soda of 4% strength by weight. Then the aqueous phase is separated and there are added to the hydrocarbon phase 2 l. of a solution of 8% strength by weight of potassium acetate in butanol. The mixture is stirred for one hour and then washed thrice, each time with 40 l. of water. After having separated the polymer from the hydrocarbon by means of a filter, the product is dried in the vacuum drier at 90° C.

There is obtained a white polyethylene powder which yields entirely colorless shaped articles when being injection molded. Even after 100 hours of injection molding, the machine parts show no corrosive phenomena.

When the operation is carried out in an aqueous lye, that is when the second working stage is avoided (addition of butanol-potassium acetate), there can, on processing such a product, already be observed distinct corrosion phenomena on the machine parts after 20 hours of injection molding. The injection plunger and the mold are covered with a red-brown layer of iron oxide. The molded articles are spotty and show discoloration phenomena.

We claim:

1. In a process for recovering solid polyolefins obtained in a hydrocarbon dispersing medium by polymerizing an olefin selected from the group consisting of ethylene, propylene, and butylene with a catalyst system consisting of an organo-aluminum compound and a titanium chloride, the improvement which comprises treating the hydrocarbon suspension of the polyolefin with a mixture of 0.1–5% by volume of dispersing medium of an alcohol of 3 to 8 carbon atoms and 0.01–1% by weight of said polymer of at least one member selected from the group consisting of an alkali metal hydroxide and an alkali metal salt of an organic acid, and then separating the purified polymer from the dispersing medium, the amount of alcohol and alkali compounds being sufficient to form a solution of the alkali in the hydrocarbon dispersant.

2. The process of claim 1 wherein the polyolefin is polypropylene and the catalyst comprises titanium trichloride and aluminum triethyl.

3. In a process for recovering solid polyolefins obtained in a hydrocarbon dispersing medium by polymerizing an olefin selected from the group consisting of ethylene, propylene, and butylene with a catalyst system consisting of an organo-aluminum compound and titanium tetrachloride, the improvement which comprises treating the hydrocarbon suspension of the polyolefin with a mixture of 0.1–5% by volume of dispersing medium of an alcohol of 3 to 8 carbon atoms and 0.01–1% by weight of said polymer of at least one member selected from the group consisting of an alkali metal hydroxide and an alkali metal salt of an organic acid, and then separating the purified polymer from the dispersing medium, the amount of alcohol and alkali compounds being sufficient to form a solution of the alkali in the hydrocarbon dispersant.

4. A process of claim 3 wherein the alcohol is butanol.

5. A process of claim 3 wherein the alkali compound employed is sodium hydroxide.

6. A process of claim 3 wherein the alkali compound employed is potassium hydroxide.

7. In a process wherein a solid polyolefin is prepared in a hydrocarbon dispersing medium by polymerizing an olefin selected from the group consisting of ethylene, propylene and butylene with a catalyst system consisting of an organo-aluminum compound and titanium tetrachloride, the improved method of purifying the polyolefin of residual catalyst which comprises washing the hydrocarbon suspension of polyolefin to remove the major portion of catalyst therefrom, and then removing the remainder of the catalyst from said hydrocarbon suspension by stirring the latter with 0.1 to 1% by weight of said polymer of an alkaline compound selected from the group consisting of an alkali metal hydroxide and an alkali metal salt of an organic acid, together with 0.1–5% by volume of said dispersing medium of an alcohol of 3 to 8 carbon atoms, said alcohol being soluble in the hydrocarbon dispersant, thereby effecting penetration of the alkali compound into the interior of the suspended polymer particles to react with the catalyst residues present therein, the amount of alcohol and alkali compounds being sufficient to form a solution of the alkali in the hydrocarbon dispersant.

8. A process of claim 7 wherein the polyolefin is polyethylene and the catalyst comprises titanium tetrachloride and diethyl aluminum monochloride.

9. A process of claim 8 wherein the polyethylene suspension is stirred with a solution of potassium hydroxide in butanol.

10. A process of claim 8 wherein the polyethylene suspension is stirred with a solution of potassium acetate in butanol.

11. A process of claim 7 wherein the polyolefin is polypropylene and the suspension is stirred with butanol and caustic soda.

References Cited in the file of this patent
UNITED STATES PATENTS

| | | |
|---|---|---|
| 2,827,447 | Nowlin et al. | Mar. 18, 1958 |
| 2,838,477 | Roelen et al. | June 10, 1958 |
| 2,843,577 | Friedlander et al. | July 15, 1958 |
| 2,845,412 | Heyson | July 29, 1958 |
| 2,868,772 | Ray et al. | Jan. 13, 1959 |
| 2,913,447 | Hofheim et al. | Nov. 17, 1959 |
| 2,921,057 | Mertzweiller | Jan. 12, 1960 |

OTHER REFERENCES

Noller: Chemistry of Organic Compounds, 2nd Edition (1957), W. B. Saunders Company, Philadelphia, page 100.